United States Patent
Tanaka et al.

(10) Patent No.: US 12,081,284 B2
(45) Date of Patent: Sep. 3, 2024

(54) APPARATUS, METHOD AND PROGRAM FOR PREDICTING ATTENUATION OF ELECTROMAGNETIC WAVES

(71) Applicant: SoftBank Corp., Tokyo (JP)

(72) Inventors: Shoma Tanaka, Tokyo (JP); Hideki Omote, Tokyo (JP); Akihiro Sato, Tokyo (JP); Sho Kimura, Tokyo (JP); HoYu Lin, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/546,437

(22) PCT Filed: Jan. 28, 2022

(86) PCT No.: PCT/JP2022/003416
§ 371 (c)(1),
(2) Date: Aug. 15, 2023

(87) PCT Pub. No.: WO2022/176575
PCT Pub. Date: Aug. 25, 2022

(65) Prior Publication Data
US 2024/0097808 A1 Mar. 21, 2024

(30) Foreign Application Priority Data
Feb. 18, 2021 (JP) .................................. 2021-024596

(51) Int. Cl.
*H04B 17/373* (2015.01)
*G01W 1/10* (2006.01)
(Continued)

(52) U.S. Cl.
CPC ............ *H04B 17/373* (2015.01); *G01W 1/10* (2013.01); *G01W 1/14* (2013.01); *H04B 17/309* (2015.01); *H04B 17/391* (2015.01)

(58) Field of Classification Search
CPC .. H04B 17/373; H04B 17/309; H04B 17/391; G01W 1/10; G01W 1/14
See application file for complete search history.

(56) References Cited

U.S. PATENT DOCUMENTS

2011/0018757 A1* 1/2011 Mizutani ................. G01S 7/025
342/26 R
2017/0269194 A1* 9/2017 Gomi ..................... G01S 13/282

FOREIGN PATENT DOCUMENTS

| CN | 105740991 A | 7/2016 |
| CN | 110648007 A | 1/2020 |

(Continued)

OTHER PUBLICATIONS

Stylianos Karapantazis, et al., "Broadband Communications Via High-Altitude Platforms: A Survey", IEEE Communications Surveys & Tutorials, First Quarter 2005, vol. 7, No. 1, pp. 2-31, May 2005.

(Continued)

*Primary Examiner* — Natasha W Cosme
(74) *Attorney, Agent, or Firm* — Muirhead and Saturnelli, LLC

(57) ABSTRACT

An apparatus, method, and program capable of predicting an attenuation of electromagnetic waves in an upper airspace of a target area in consideration of the influence of long-term weather changes in future are provided. An apparatus for predicting an attenuation of electromagnetic waves between a radio apparatus located above a target area and a terrestrial surface is provided with a data acquisition section for acquiring past weather data in the target area, and an estimation section for estimating a weather corresponding to a future target year in the upper airspace of the target area based on the past weather data, and estimating an attenuation of electromagnetic waves based on an estimation result of the weather.

12 Claims, 9 Drawing Sheets

(51) Int. Cl.
  *G01W 1/14* (2006.01)
  *H04B 17/309* (2015.01)
  *H04B 17/391* (2015.01)

(56) References Cited

FOREIGN PATENT DOCUMENTS

| JP | 10-268065 A | 10/1998 |
|----|-------------|---------|
| JP | 11-074804 A | 3/1999 |
| JP | 2004-205233 A | 7/2004 |
| JP | 2006-246375 A | 9/2006 |
| JP | 2014-026625 A | 2/2014 |
| KR | 10-1898629 B1 | 9/2018 |

OTHER PUBLICATIONS

International Telecommunication Union, "Propagation data and prediction methods required for the design of Earth-space telecommunication systems", Recommendation ITU-R p. 618-13 (Dec. 2017).
International Search Report and Written Opinion Dated for PCT Application No. PCT/JP2022/003416, Apr. 26, 2033.
Notice for Reasons of Refusal for Japanese Patent Application No. 2021-024596, Dated Apr. 15, 2022.
Decision to Grant A Patent for Japanese Patent Application No. 2021-024596, Dated Oct. 7, 2022.
International Preliminary Report on Patentability, Dated Aug. 22, 2023.
European Search Report, Dated May 23, 2024.
European Office Action, Dated Jun. 5, 2024.

\* cited by examiner

APPARATUS, METHOD AND PROGRAM FOR PREDICTING ATTENUATION OF ELECTROMAGNETIC WAVES

TECHNICAL FIELD

The present invention relates to an apparatus, method and program for predicting an attenuation of electromagnetic waves in a space between a radio apparatus located above a target area and a terrestrial surface.

BACKGROUND ART

As this type of radio apparatus, there is conventionally known a communication relay apparatus (for example, see Non-Patent Literature 1) such as High Altitude Platform Station (HAPS) (also referred to as "High Altitude Pseudo Satellite"), an artificial satellite or the like, which can float and stay in a predetermined airspace above the terrestrial surface. In order to design a line using high frequency of millimeter waves, etc. between the radio apparatus located in this kind of the upper airspace and a radio apparatus on the ground (or on the sea), it is necessary to clarify rainfall attenuation characteristics that have a particularly influence on a propagation loss in a space of radio propagation path through which radio waves of radio communication pass. Recommendation ITU-R P.618-13 (see Non-Patent Literature 2) is known as a model for estimating a rainfall attenuation in the upper airspace (hereinafter also referred to as "rainfall attenuation model").

CITATION LIST

Non-Patent Literature

Non-Patent Literature 1: S. Karapantazis and F. Pavlidou, IEEE Communications Surveys & Tutorials, vol. 7, no. 1, pp. 2-31, May 2005.
Non-Patent Literature 2: "Propagation data and prediction methods required for the design of Earth-space telecommunication systems", Recommendation ITU-R P.618-13 (December 2017).

SUMMARY OF INVENTION

Technical Problem

However, since the conventional rainfall attenuation model uses empirical and statistical parameters based on the past measurement data, it is difficult to cope with a change of rainfall attenuation due to the influence of a long-term climate change caused by a global warming that is expected in future, or the like. Therefore, a rainfall attenuation model capable of considering the influence of the future long-term climate change caused by the further global warming in future or the like, is required.

Solution to Problem

An apparatus according to an aspect of the present invention is an apparatus for predicting an attenuation of electromagnetic waves between a radio apparatus located above a target area and a terrestrial surface. This apparatus comprises a data acquisition section for acquiring past weather data in the target area, and an estimation section for estimating a weather corresponding to a future target year in an upper airspace of the target area based on the past weather data, and estimating an attenuation of electromagnetic waves based on an estimation result of the weather.

In the foregoing apparatus, the data acquisition section may acquire past rainfall-intensity data in the target area, and the estimation section may update a correction term included in an estimation equation of rainfall intensity for estimating a future rainfall intensity in the target area, based on the past rainfall-intensity data corresponding to the target area, estimate a rainfall intensity of the future target year in the target area, based on the estimation equation of rainfall intensity including the correction term after updating, and estimate the attenuation of the electromagnetic waves corresponding to the future target year in the target area, based on an estimation result of the rainfall intensity.

Herein, the data acquisition section may acquire rainfall-intensity data corresponding to each of past plural years in the target area, and the estimation section may calculate a rainfall intensity corresponding to each of the past plural years in the target area by using the estimation equation of rainfall intensity, calculate plural estimation errors of rainfall intensity which are respectively a difference between the calculated value of the rainfall intensity and the data of the rainfall intensity corresponding to each of the past plural years in the target area, and update the correction term included in the estimation equation of rainfall intensity so that an average value of the plural estimation errors of rainfall intensity is smaller than a predetermined threshold value.

In the foregoing apparatus, the data acquisition section may acquire past rainfall-intensity data and past rainfall-height data in the target area, and the estimation section may update a correction term included in an estimation equation of rainfall intensity for estimating a future rainfall intensity in the target area, based on the past rainfall-intensity data corresponding to the target area, update a correction term included in an estimation equation of rainfall height for estimating a future rainfall height in the target area, based on the past rainfall-height data corresponding to the target area, estimate a rainfall intensity of the future target year in the target area, based on the estimation equation of rainfall intensity including the correction term after updating, estimate a rainfall height of the future target year in the target area, based on the estimation equation of rainfall height including the correction term after updating, and estimate an attenuation of electromagnetic waves corresponding to the future target year in the target area, based on an estimation result of the rainfall intensity and an estimation result of the rainfall height.

Herein, the data acquisition section may acquire rainfall-intensity data and rainfall-height data corresponding to each of past plural years in the target area, and the estimation section may calculate a rainfall intensity corresponding to each of the past plural years in the target area by using the estimation equation of rainfall intensity, calculate plural estimation errors of rainfall intensity which are respectively a difference between the calculated value of the rainfall intensity and the rainfall-intensity data corresponding to each of the past plural years in the target area, update the correction term included in the estimation equation of rainfall intensity so that an average value of the plural estimation errors of rainfall intensity is smaller than a predetermined threshold value, calculate a rainfall height corresponding to each of the past plural years in the target area by using the estimation equation of rainfall height, calculate plural estimation errors of rainfall height which are respectively a difference between the calculated value of the rainfall height and the rainfall-height data corresponding to each of the past plural years in the target area, and update the correction term included in the estimation equation of rainfall height so that an average value of the plural estimation errors of rainfall height is smaller than a predetermined threshold value.

In the foregoing apparatus, the rainfall intensity subject to be estimated may be a rainfall intensity $R_{0.01}$ [mm/h] corresponding to a case that a time percentage in one year is 0.01%.

A method according to another aspect of the present invention is a method for predicting an attenuation of electromagnetic waves between a radio apparatus located above a target aria and a terrestrial surface. This method comprises acquiring past weather data in the target area, and estimating a weather corresponding to a future target year in an upper airspace of the target area based on the past weather data, and estimating an attenuation of electromagnetic waves based on an estimation result of the weather.

A program according to yet another aspect of the present invention is a program executed by a computer or processor installed in an apparatus for predicting an attenuation of electromagnetic waves between a radio apparatus located above a target area and a terrestrial surface. This program includes a program code for acquiring past weather data in the target area, and a program code for estimating a weather corresponding to a future target year in an upper airspace of the target area based on the past weather data, and estimating the attenuation of the electromagnetic waves based on an estimation result of the weather.

In the foregoing apparatus, the foregoing method, and the foregoing program, the electromagnetic waves may be radio waves or light waves.

Advantageous Effects of Invention

According to the present invention, by estimating a weather corresponding to a future target year in an upper airspace of a target area based on past weather data in a target area, and estimating an attenuation of electromagnetic waves based on a weather estimation result, it is possible to predict the attenuation of electromagnetic waves in the upper airspace of the target area in consideration of the influence of long-term climate change in future.

DESCRIPTION OF EMBODIMENTS

Hereinafter, embodiments of the present invention are described with reference to the drawings.

An apparatus according to an embodiment described herein is an apparatus that can predict an attenuation of radio waves in an upper airspace of a target area in consideration of the influence of weather changes over a long period of time (for example, global warming with a long-term temperature increase), by estimating a weather (for example, rainfall intensity, rainfall height, or both) corresponding to a future target year in an upper airspace of the target area based on the past weather data (for example, rainfall-intensity data, rainfall-height data, or both) in the target area, and estimating an attenuation of radio waves based on the weather estimation result.

Figure 1:
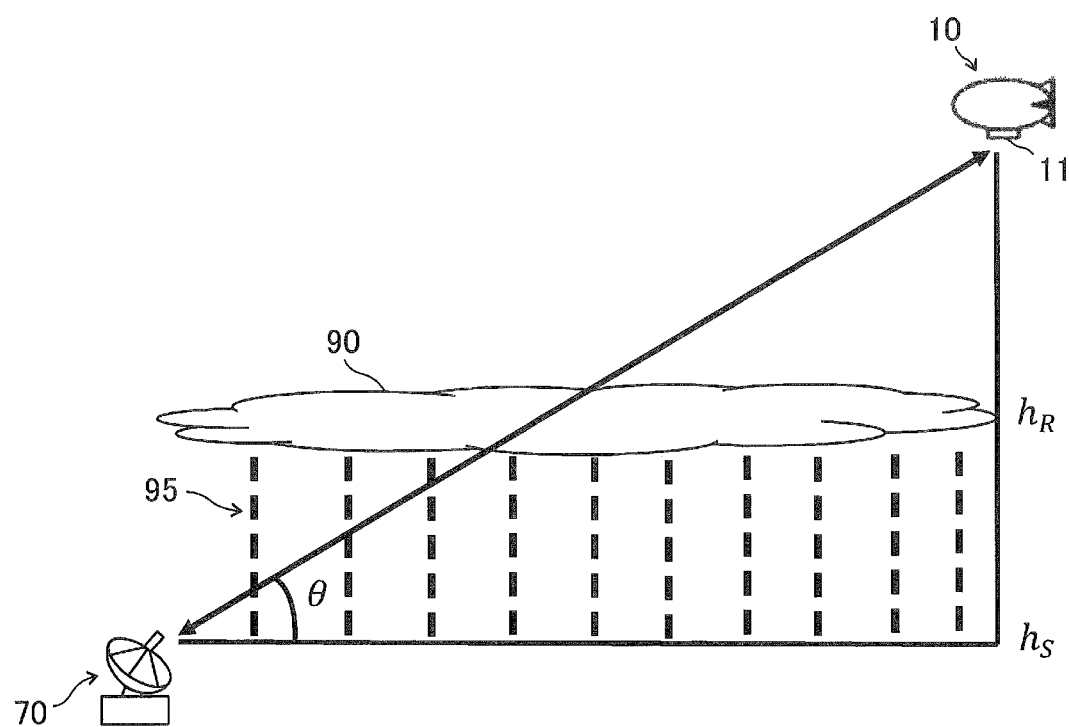
FIG. 1 is an illustration showing an example of a rainfall attenuation model in which radio waves for radio communication are attenuated by a rainfall in an upper airspace in a radio system according to an embodiment.

FIG. 1 is an illustration showing an example of a rainfall attenuation model in which radio waves for radio communication are attenuated by a rainfall in an upper airspace in a radio system according to an embodiment. In FIG. 1, the radio communication system is provided with a High Altitude Platform Station (HAPS) (also called "High Altitude Pseudo Satellite" or "Stratospheric Platform") 10 as an aerial-floating type communication relay apparatus (radio apparatus) located in an airspace (hereinafter also referred to as "upper airspace") above a target area. The HAPS 10 is located in an airspace at a predetermined altitude and forms a three-dimensional cell (three-dimensional area) in a cell-formation target airspace at a predetermined altitude. The HAPS 10 is an airship as a floating object that is controlled by autonomous control or external control so as to float or fly and be located in a high-altitude airspace (floating airspace) of 100 [km] or less from the ground level or the sea level, and has a relay communication station 11 installed therein. The HAPS 10 may be a balloon, solar plane, or another floating object with a relay communication station mounted thereon. The relay communication station of the HAPS 10 may have a function of a slave repeater, or may have a function of a base station of a mobile communication system (for example, eNodeB of the LTE or gNodeB of the next-generation such as 5G).

The radio apparatus located in the upper airspace in the present embodiment may be, for example, a radio apparatus (for example, satellite communication apparatus, satellite broadcasting apparatus) incorporated in an artificial satellite located at an altitude of 100 [km] or more. The radio apparatus located in the upper airspace may be a power transmission apparatus that transmits the electric power to a terrestrial apparatus via an electromagnetic wave such as a microwave, millimeter wave, light wave (for example, laser light), a power reception apparatus that receives the electric power from a terrestrial apparatus via an electromagnetic wave such as a microwave, millimeter wave, and light wave (for example, laser light), or a radio apparatus that has the functions of both their power transmission apparatus and power reception apparatus.

In the following embodiments, it is mainly described of a case that the radio apparatus located in the upper airspace is the relay communication station (particularly, the slave repeater) 11 of the HAPS 10 and radio waves (electromagnetic waves) are transmitted and received between the HAPS 10 and the terrestrial surface.

The airspace in which the HAPS 10 is located is, for example, a stratospheric airspace at an altitude of 11 [km] or more and 50 [km] or less on the ground (or on the water such as the sea or lake). The airspace may be an airspace at an altitude of 15 [km] or more and 25 [km] or less where weather conditions are relatively stable, and may be an airspace at an altitude of about 20 [km] in particular.

A cell-formation target airspace, which is a target airspace for forming a three-dimensional cell with one or more HAPS 10 in the communication system of the present embodiment, is, for example, an airspace of a predetermined altitude range (for example, an altitude range of 50 [m] or more and 1000 [m] or less) located between the airspace in which the HAPS 10 is located and a cell formation area near the ground covered by a base station such as a conventional macro-cell base station (for example, eNodeB of the LTE or gNodeB of the next generation such as 5G).

The cell-formation target airspace, in which the three-dimensional cell of the present embodiment is formed, may be an upper airspace on the sea, river, or lake of the terrestrial surface. Further, the three-dimensional cell formed by the HAPS 10 may be formed so as to reach the ground level or the sea level so that a communication can be performed even with a terminal apparatus as a user apparatus (mobile station) located on the ground or on the sea.

In FIG. 1, a link between the HAPS 10 and a gateway station (also referred to as a "feeder station", hereinafter referred to as a "GW station") 70, which is a radio apparatus on the ground side, is called a "feeder link" FL, and a link between the HAPS 10 and a terminal apparatus located in a service area on or near the terrestrial surface is called a "service link" SL. Further, a downlink of communication from the GW station 70 toward the terminal apparatus via the HAPS 10 is called a "forward link", and an uplink of communication from the terminal apparatus toward the GW station 70 via the HAPS 10 is also called a "reverse link".

It is noted that the HAPS 10 and the radio apparatus on the terrestrial surface side may be a radio apparatus (for example, FWA: Fixed Wireless Access) provided on the ground or on the sea so as to be located at a location different from the GW station 70.

The relay communication station provided in the HAPS 10 forms plural beams toward the ground for performing a radio communication with a terminal apparatus on the terrestrial surface by an antenna for service link (hereinafter referred to as "SL antenna"). The area through which the beam of the HAPS 10 passes is a three-dimensional cell, and a footprint of the three-dimensional cell becomes a service area on the ground (or on the water such as the sea or lake), in which a communication service of the terminal apparatus is provided.

The terminal apparatus may be not only the terminal apparatus located in the service area on the ground or the like (or on the water such as the sea or lake), but also a communication terminal module incorporated in a drone that is an aircraft such as a small helicopter capable of remotely steering, or a user equipment (UE) used by a user on the ground or the like (or on the water such as the sea or lake) or in a terrestrial airplane.

The relay communication station 11 of the HAPS 10 can, for example, perform a feeder-link radio communication with the GW station 70 on the ground (or on the sea) of the terrestrial surface side. The relay communication station is connected to a core network of a mobile communication network via the GW station 70 disposed on the ground or on the sea, to which a radio communication can be performed by an antenna for feeder link (hereinafter referred to as "FL antenna"). A feeder link communication between the relay communication station 11 of the HAPS 10 and the GW station 70 may be performed by a wireless communication using radio waves such as microwaves and millimeter waves, or may be performed by optical communication using laser light or the like.

The HAPS 10 may control directional beams of the FL antenna to track the GW station 70 when moving in the air. It is possible to suppress a deterioration of communication quality of the feeder link due to the movement of the HAPS 10, by tracking the GW station 70 with the FL antenna. As a method for controlling the directional beam of the FL antenna, various kinds of methods such as a gimbal method, an electric method (360-degree beam forming method), an electric method (angle-limited beam forming method+antenna switching), and the like can be used.

The GW station 70 may control its own antenna for feeder link (hereinafter referred to as "GW antenna") so as to track the HAPS 10 moving in the air. Even when the GW antenna having high directivity such as a parabolic antenna is used, it is possible to suppress a deterioration of communication quality of the feeder link due to the movement of the HAPS 10, by tracking the HAPS 10 with the GW antenna. As a method for controlling the directional beam of the GW antenna, various kinds of methods such as a gimbal method, an electric method (360-degree beam forming control method), an electric method (angle-limited beam forming control method+antenna switching), and the like can be used.

In the communication system provided with the HAPS 10 of the present embodiment as shown in FIG. 1, if there is a propagation-loss increasing part 95 such as a rainfall area, which is a space where the propagation loss (amount of radio signal attenuation) of cloud 90, rainfall (guerrilla downpour), snowfall, storm, sandstorm, and the like, is increasing, in a radio propagation path such as a millimeter wave or a microwave of the feeder link between the HAPS 10 and the GW station 70, the amount of radio signal attenuation in the feeder link may increase and the communication quality may deteriorate, and the communication quality in the service link between the terminal apparatus of the three-dimensional cell corresponding to the feeder link and the HAPS 10 may deteriorate. In case that the deterioration of communication quality is large, the communication of the service link may also be interrupted.

In FIG. 1, "$h_S$" is the altitude (hereinafter referred to as "terrestrial station height") [km] of the GW station (terrestrial station) 70, "$h_R$" is the altitude (hereinafter referred to as "rainfall height") [km] of the upper end of the propagation-loss increasing part 95 where a rainfall or the like is generated from the cloud 90, and "θ" is the elevation angle that looked at the HAPS 10 from the GW station 70 with reference to the horizontal plane.

In order to design a line using high frequency of millimeter waves between the HAPS 10 located in the upper airspace and the GW station (terrestrial station) 70, it is necessary to clarify rainfall attenuation characteristics that have a particularly influence on the propagation loss in a space of radio propagation path through which radio waves pass. In the aforementioned Recommendation ITU-R P.618-13 (see Non-Patent Literature 2), a rainfall attenuation model has been proposed for estimating the rainfall attenuation, which is the attenuation of radio waves due to the rainfall, with parameters such as rainfall intensity $R_{0.01}$ [mm/h], rainfall height $h_R$ [km], terrestrial station height $h_S$ [km], and elevation angle $\theta$ [degrees], for each area. Herein, the rainfall intensity $R_{0.01}$ is a rainfall intensity [mm/h] that corresponds to a case that a time percentage is 0.01 [%] (approximately one hour) with one year as 100%.

Figure 2:
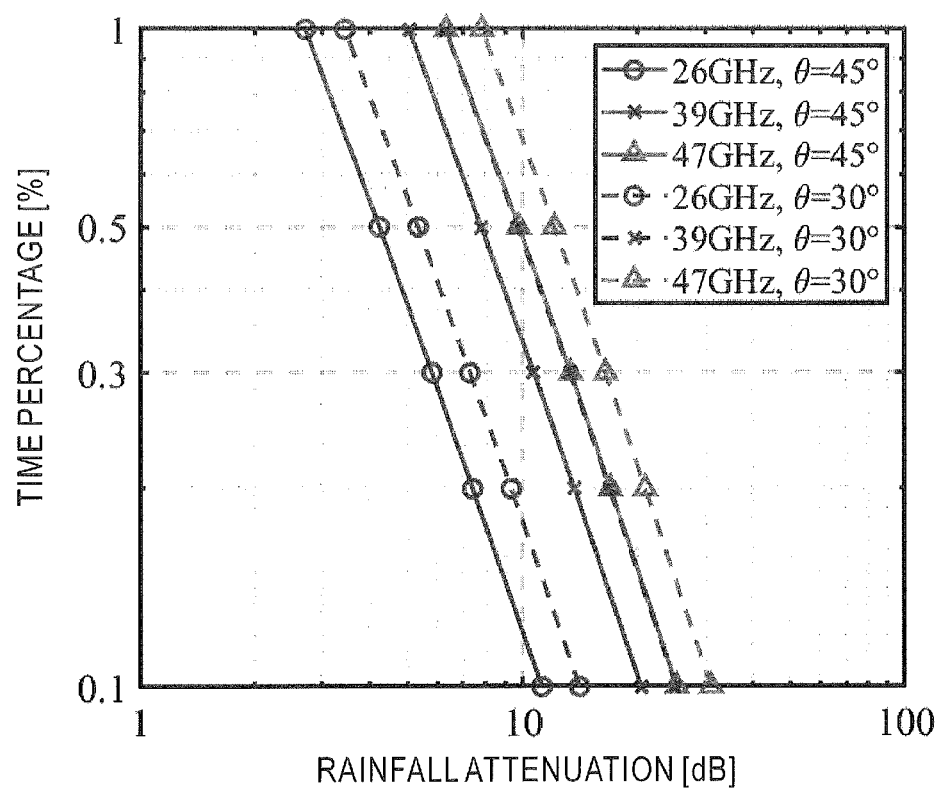
FIG. 2 is a graph showing an example of rainfall attenuation characteristics.

FIG. 2 is a graph showing an example of rainfall attenuation characteristics in Tokyo for combinations of plural frequencies f (26, 39, 47 [GHz]) and elevation angles $\theta$ (30, 45 (degrees)). The horizontal axis in FIG. 2 is the attenuation [dB] of radio waves due to the rainfall, and the vertical axis in FIG. 2 is a time percentage [%] with one year as 100%. In FIG. 2, if the time percentage decreases, the attenuation due to the rainfall increases. Since the rainfall attenuation increases as the frequency f increases, it is important to clarify the rainfall attenuation characteristics in the line design between the terrestrial surface and the upper airspace at high frequency.

However, since the conventional rainfall attenuation models use empirical and statistical parameters based on past measurement data, it is difficult to respond to a change in the rainfall attenuation due to the influence of the long-term climate change caused by a global warming that is expected in future or the like.

Therefore, in the present embodiment, regarding the rainfall attenuation which is important in the design of radio line between the terrestrial surface and the upper airspace, a new rainfall attenuation model is proposed in consideration of the influence of the future long-term climate change caused by a further global warming in future or the like on the basis of a statistical analysis of weather data such as past rainfall intensity or the like, and the attenuation of radio waves in the upper airspace of the target area is predicted with high accuracy in consideration of the influence of the long-term climate change caused by the global warming or the like, based on the new rainfall attenuation model.

Figure 3A:
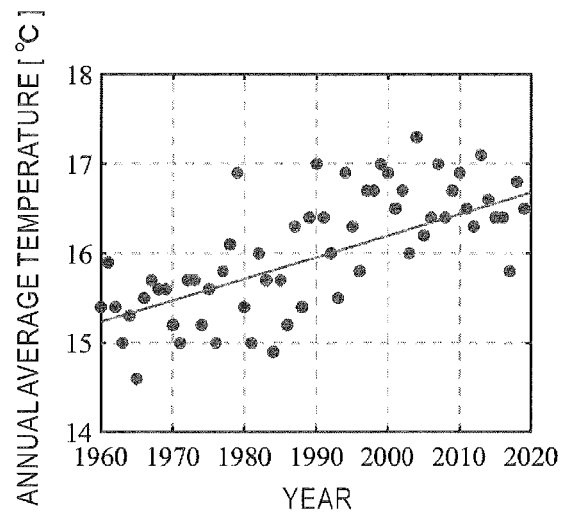
FIG. 3A is a graph showing an example of changes in annual average temperature and changes in annual rainfall.
Figure 3B:
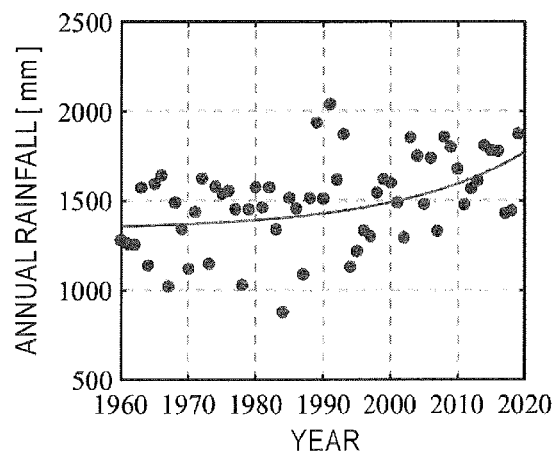
FIG. 3B is a graph showing an example of changes in annual average temperature and changes in annual rainfall.

Each of FIG. 3A and FIG. 3B is a graph showing an example of changes in annual average temperature and changes in annual rainfall. The global warming has been attributed to human influence since 1950 (see "Japan Meteorological Agency, Global Warming Prediction Information Vol. 9, 2017"). FIG. 3A shows the changes in the annual average temperature of the terrestrial surface from 1960 to 2019 in Tokyo, and FIG. 3B shows the changes in total annual rainfall from 1960 to 2019 in Tokyo. From both figures, it can be seen that both the average temperature and rainfall have been on upward trends since 1960.

Figure 4:
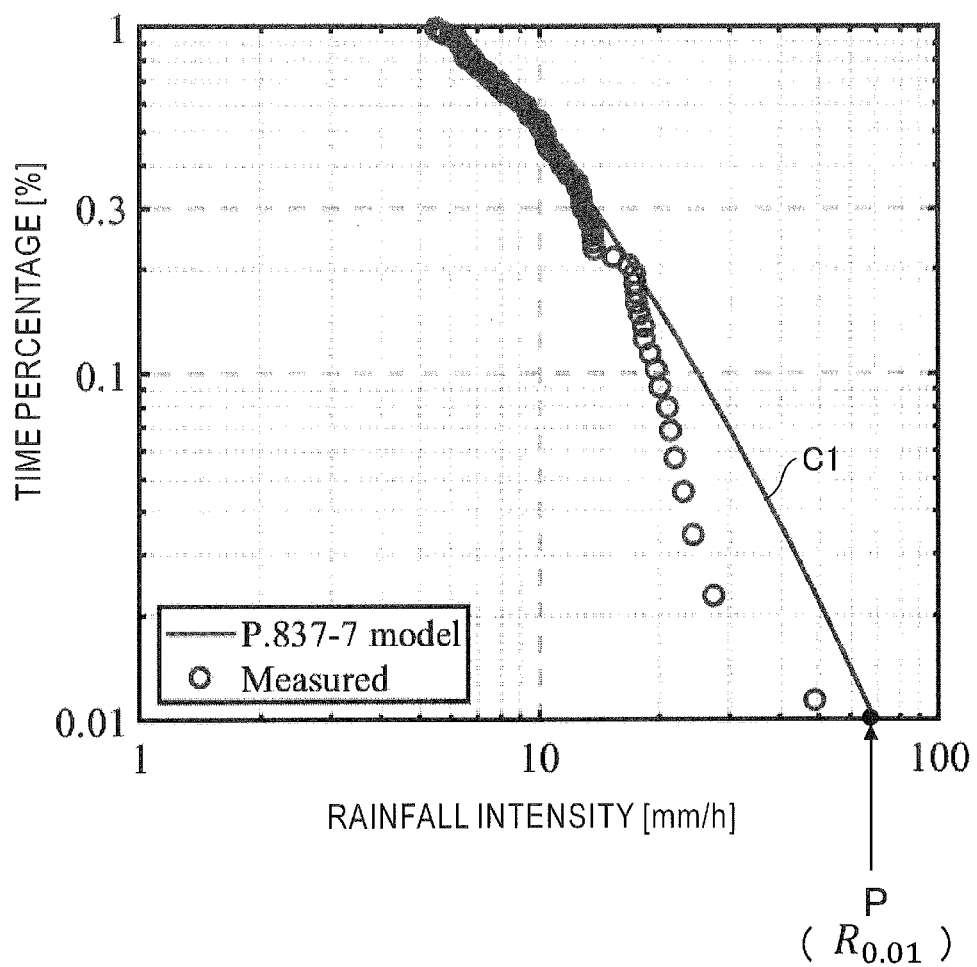
FIG. 4 is a graph showing an example of measured values and estimated values of one-hour rainfall intensity for one year.

FIG. 4 is a graph showing an example of measured and estimated values of hourly rainfall intensity [mm/h] for one year (October 2019 to September 2020) in Koto Ward, Tokyo. The outlined circles "O" in FIG. 4 are the measured values. The curve C1 is an estimated value calculated based on the rainfall estimation model proposed in the Recommendation ITU-R P.837-7 ("Characteristics of precipitation for propagation modeling", Recommendation ITU-R P.837-7 (June 2017)). In the rainfall estimation model, an average temperature of the terrestrial surface every month T [K] and an average rainfall every month MT [mm] are used as weather-related parameters. The rainfall intensity at the point P in FIG. 4 is the rainfall intensity $R_{0.01}$ [mm/h] with respect to the time percentage of 0.01 [%].

The measured results (O) of the one-hour rainfall intensity [mm/h] in FIG. 4 agree relatively well with the estimated values (C1) by the rainfall estimation model. However, considering the changes in the rainfall characteristics caused by the global warming as shown in FIG. 3B described above, in future, the measured values of the rainfall intensity are expected to outperform the rainfall estimation model. As a result, it is predicted that, after a few years, the attenuation of radio waves will increase due to the changes in rainfall characteristics caused by the global warming, and the rainfall attenuation characteristics exemplified in FIG. 2 described above will shift to the right in the figure.

In the rainfall estimation model, when the average temperature T [K] of the terrestrial surface every month and average rainfall MT [mm] every month, which are the weather-related parameters, are changed, the rainfall intensity $R_{0.01}$ [mm/h] with respect to the hour ate of 0.01 [%] fluctuates. However, since the rainfall estimation model uses the average temperature T and the average rainfall MT, which are empirical and statistical parameters, is not possible to predict a rainfall intensity in future.

As shown below in the present embodiment, in order to avoid an underestimation of propagation loss in future line design, a new rainfall attenuation model is proposed, which implements parameters such as a rainfall intensity $R_{0.01}$ M and a rainfall height $h_R(t)$ in consideration of the influence of global warming at future long-term time t. By estimating the weather parameters such as the rainfall intensity $R_{0.01}(t)$ and rainfall height $h_R(t)$ corresponding to the future target year t in the upper airspace of the target area based on the new rainfall attenuation model and past weather data, and estimating the attenuation of radio waves based on the estimation results of the weather parameters, the attenuation of radio waves in the upper airspace of the target area is predicted considering the influence of the climate change caused by the long-term global warming in future or the like.

Figure 5:
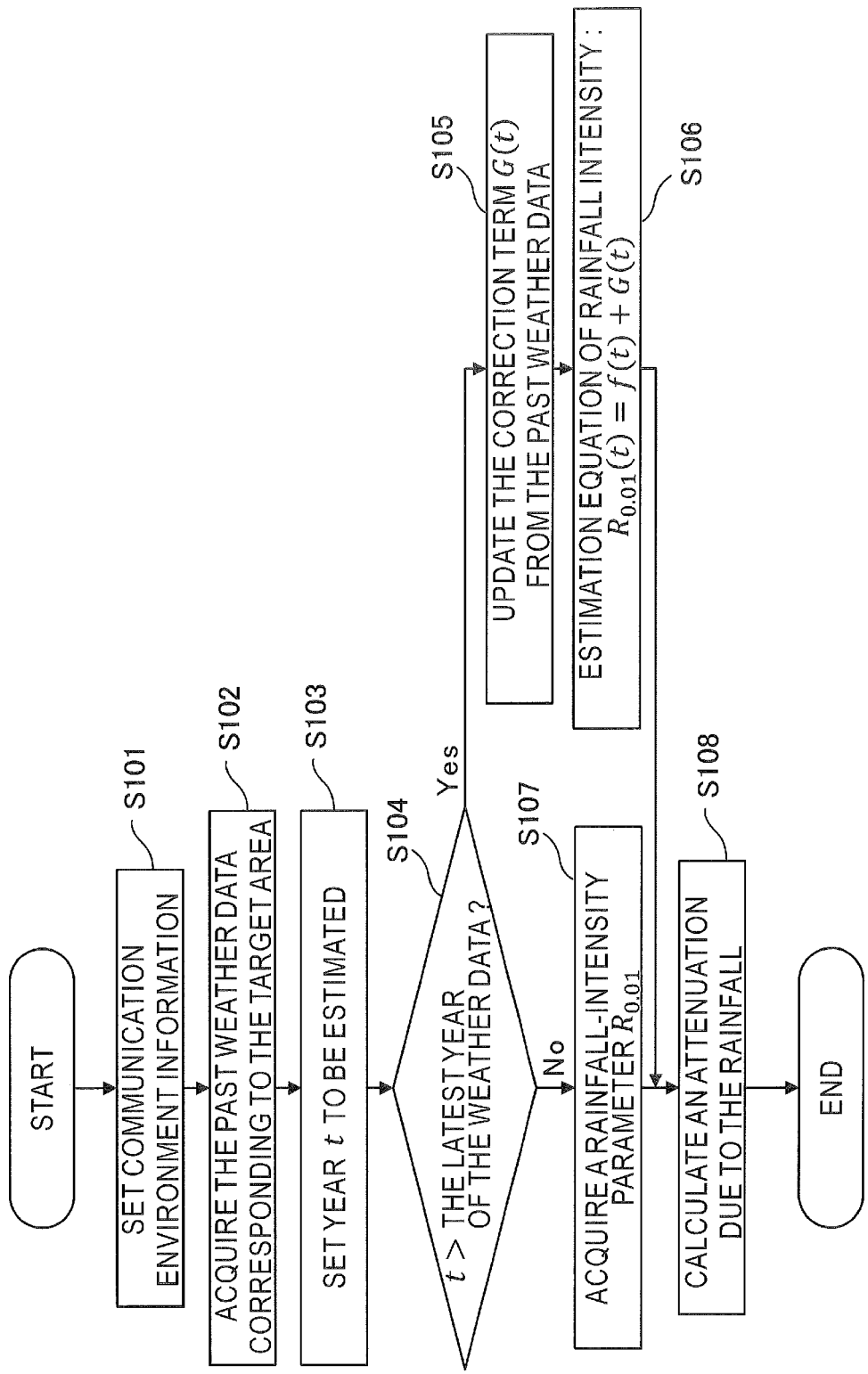
FIG. 5 is a flowchart showing an example of a rainfall-attenuation prediction method in consideration of future rainfall intensity according to an embodiment.

FIG. 5 is a flowchart showing an example of a method for predicting the rainfall attenuation in consideration of the future rainfall intensity according to the embodiment. In FIG. 5, first, communication environment information of radio communication is set (S101). The communication environment information is, for example, latitude $\varphi$, longitude $\lambda$, frequency f, terrestrial station height $h_S$, and elevation angle $\theta$ between the transmitter and receiver (for example, between the relay communication station 11 of the HAPS 10 and the GW station 70). Next, past weather data for the target area is acquired (S102). The weather data includes at least a rainfall height $h_R$ and a rainfall intensity $R_{0.01}$.

Next, the year (hereinafter referred to as a "target year") t for estimating a rainfall intensity and an attenuation is set (S103), and it is determined whether or not the set target year t is later than the latest year of the acquired weather data (S104).

If the set target year t is later than the latest year of the weather data (Yes in S104), the correction term G(t) of the estimation equation for estimating the future rainfall intensity $R_{0.01}(t)$ in the target area shown in the following equation (1) is updated from the past weather data (S105), and the rainfall intensity $R_{0.01}(t)$ in the target year t is estimated based on the estimation equation of the rainfall intensity $R_{0.01}(t)$ of the following equation (1) including the correction term G(t) after update (S106).

$$R_{0.01}(t)=f(t)+G(t) \quad (1)$$

Herein, f(t) in the estimation equation of the equation (1) is an arbitrary function, and as an example, it can be expressed as in the following equation (2) using coefficients a, b, and c.

$$f(t)=a \cdot \exp(b \cdot t)+c \quad (2)$$

On the other hand, if the set target year t is equal to or before the latest year of the weather data (No in S104), for example, the value of the rainfall intensity parameter $R_{0.01}$ in the target year t included in the weather data is acquired (S107).

Next, the attenuation of radio waves due to the rainfall in target year t is estimated (S108). Herein, if the target year t is later than the latest year of the weather data, the attenuation of radio waves due to the rainfall in the target year t is estimated based on the rainfall intensity $R_{0.01}(t)$ estimated by the estimation equation in S106 described above. On the other hand, if the target year t is equal to or before the latest year of the weather data, the attenuation of radio waves due to the rainfall in the target year t is estimated based on the rainfall intensity Rom' acquired in S107 described above.

According to the method for predicting the rainfall attenuation in FIG. 5, it is possible to predict the attenuation of radio waves in the upper airspace of the target area in consideration of the influence of the fluctuations of the long-term rainfall intensity $R_{0.01}(t)$ due to the future global warming in the target year t of the target area, or the like.

Figure 6:
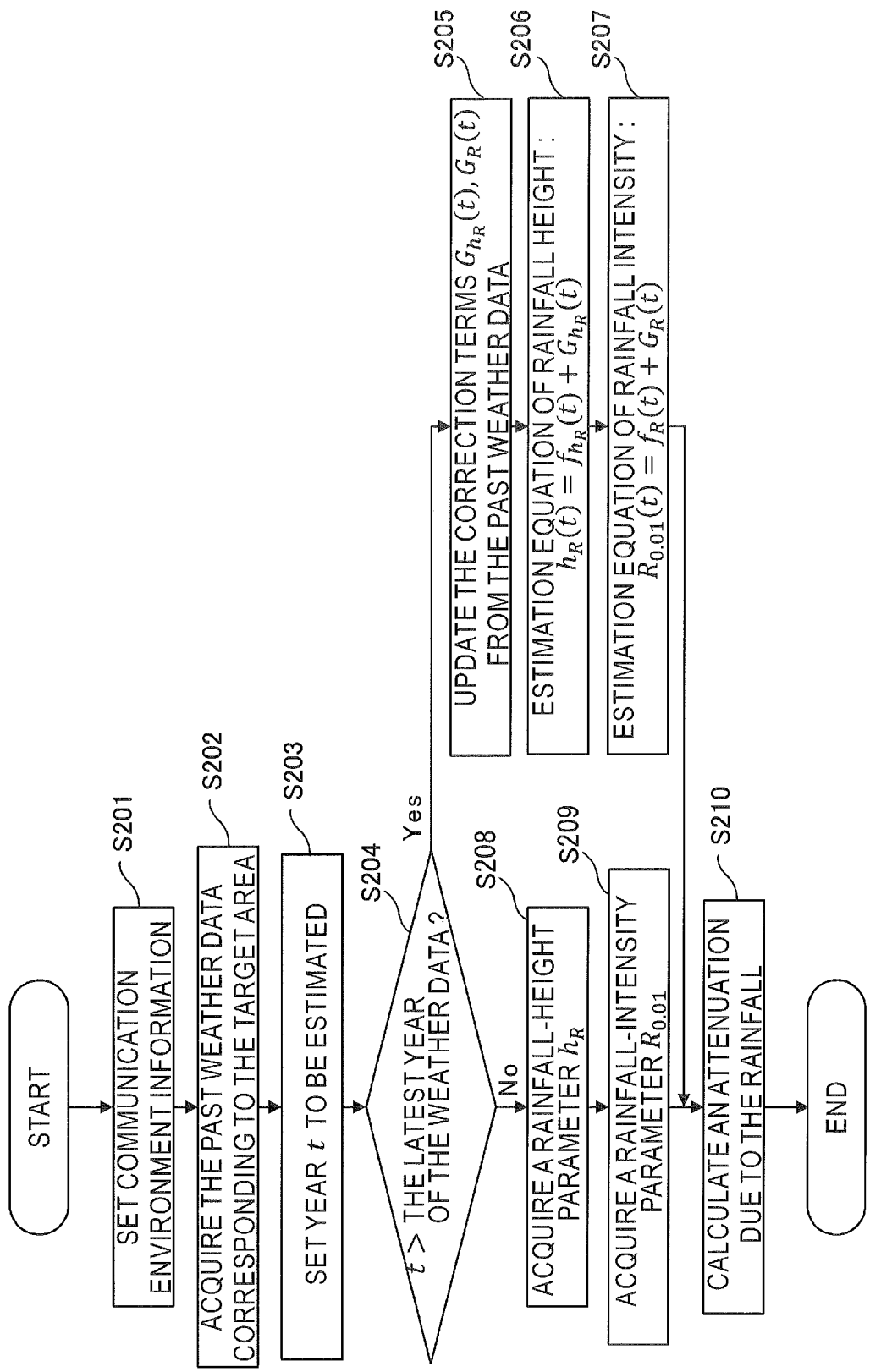
FIG. 6 is a flowchart showing an example of a rainfall-attenuation prediction method in consideration of future rainfall intensity and rainfall height according to an embodiment.

FIG. 6 is a flowchart showing an example of a method for predicting the rainfall attenuation in consideration of the future rainfall intensity and the rainfall height according to the embodiment. Since the steps of S201 to S204 in FIG. 6 are the same as the steps of S101 to S104 in FIG. 5 described above, the description thereof is omitted.

In FIG. 6, if the set target year t is later than the latest year of the weather data (Yes in S204), the correction term $G_{h_R}(t)$ of the estimation equation for estimating the future rainfall height $h_R(t)$ in the target area shown in the following equation (3) and the correction term $G_R(t)$ of the estimation equation for estimating the future rainfall intensity $R_{0.01}$ in the target area shown in the following equation (4) are updated from the past weather data (S205).

$$h_R(t) = f_{h_R}(t) G_{h_R}(t) \quad (3)$$

$$R_{0.01}(t) = f_R(t) G_R(t) \quad (4)$$

Herein, each of the $f_{h_R}(t)$ and $f_R(t)$ in the estimation equations of the equation (3) and equation (4) is an arbitrary function, and as an example, it can be expressed as in the following equation (5) and the following equation (6) using coefficients a', b', c', a", b", and c".

$$f_{h_R}(t) = a' \cdot \exp(b' \cdot t) + c' \quad (5)$$

$$f_R = a'' \cdot \exp(b'' \cdot t) + c'' \quad (6)$$

Next, the rainfall height $h_R(t)$ in the target year t is estimated based on the estimation equation for the rainfall height $h_R(t)$ of the equation (3) including the correction term $G_{h_R}(t)$ after update (S206), and the rainfall intensity $R_{0.01}(t)$ in the target year t is estimated based on the estimation equation for the rainfall intensity $R_{0.01}(t)$ of the equation (4) including the correction term $G_R(t)$ after update (S207).

On the other hand, if the set target year t is equal to or before the latest year of the weather data (No in S204), for example, the value of the rainfall height parameter $h_R$ and the value of the rainfall intensity parameter $R_{0.01}$ in the target year t included in the weather data are acquired (S208, S209).

Next, the attenuation of radio waves due to the rainfall in the target year t is estimated (S210). Herein, if the target year t is later than the latest year of the weather data, the attenuation of radio waves due to the rainfall in the target year t is estimated based on the rainfall height $h_R(t)$ and the rainfall intensity $R_{0.01}(t)$ estimated by the estimation equations in S206 and S207 described above. On the other hand, if the target year t is equal to or before the latest year of the weather data, the attenuation of radio waves due to the rainfall in the target year t is estimated based on the rainfall height $h_R$ and the rainfall intensity $R_{0.01}$ acquired in S208 and S209 described above.

According to the method for predicting rainfall attenuation in FIG. 6, it is possible to more accurately predict the attenuation of radio waves in the upper airspace of the target area in consideration of the influence of fluctuations in both long-term rainfall height $h_R(t)$ and rainfall intensity $R_{0.01}(t)$ due to the future global warming in the target year t of the target area, or the like.

Figure 7:
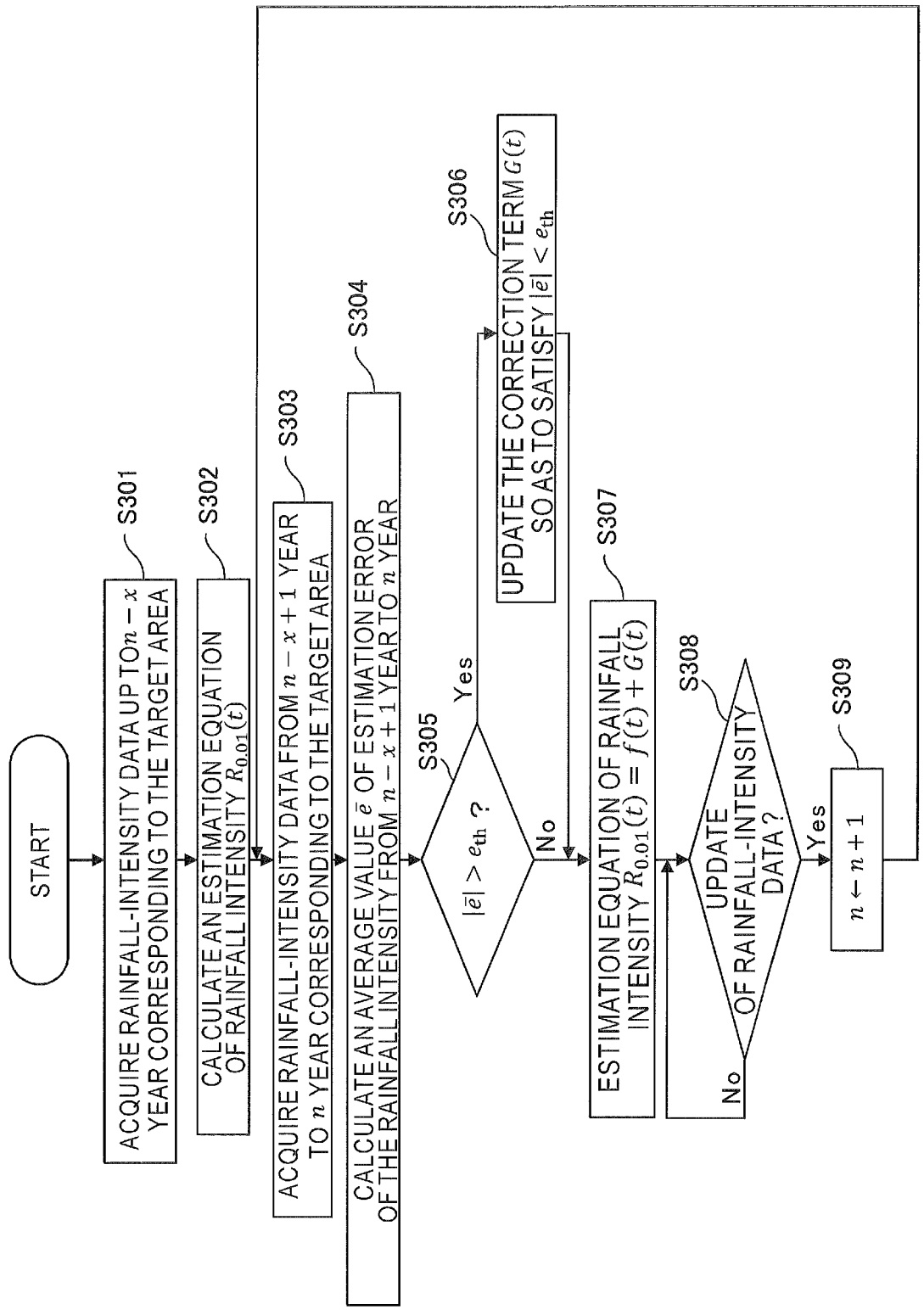
FIG. 7 is a flowchart showing an example of procedures for updating a correction term in an estimation equation for rainfall intensity.

FIG. 7 is a flow chart showing an example of procedures for updating the correction term G(t) in the estimation equation for the rainfall intensity $R_{0.01}(t)$ of FIG. 5. The correction term $G_R(t)$ in the estimation equation for the rainfall intensity $R_{0.01}(t)$ of FIG. 6 can also be updated by the procedures similar to those shown in the present example.

In FIG. 7, first, rainfall-intensity data is acquired as the past weather data up to n−x year corresponding to the target area (S301). Herein, "n" is the latest year in which the past rainfall-intensity data can be acquired, and "x" is the number of years when calculating the moving average. For example, assuming that the latest year n is 2020 and the moving average number of years x is 5 years, the past rainfall-intensity data up to 2015 (=2020−5) is acquired.

Next, based on the past rainfall-intensity data acquired in S301, an estimation equation for the rainfall intensity $R_{0.01}(t)$ shown in the aforementioned equation (1) is calculated (S302). However, the correction term G(t) in the equation (1) is initially set to zero.

Next, rainfall-intensity data is acquired as the weather data for the past five years from n−x+1 year to n year corresponding to the target area (S303). For example, assuming that the latest year n is 2020 and the moving average number of years x is 5 years, the rainfall-intensity data for the past 5 years from 2016 to 2020 is acquired.

Next, an average value of estimation error e of rainfall intensity for the past five years from n−x+1 year to n year is calculated using the following equation (7) (S304), and the absolute value of the average value of the estimation error e is compared with a predetermined threshold value $e_{th}$ (S305). The threshold value eth is set in advance and is, for example, 0.001.

$$\bar{e} = \frac{1}{x} \cdot \sum_{i=n-x+1}^{n} \{R_{0.01}(i) - (\text{rainfall intensity of } i \text{ year})\} \quad (7)$$

If the absolute value of the average value of the estimation error of the rainfall intensity is greater than the threshold value eth (Yes in S305), the correction term G(t) in the aforementioned equation (1) is adjusted and updated so as to satisfy the condition that the absolute value of the average value of the estimation errors of the rainfall intensity is smaller than the threshold value eth. Herein, for example, the correction term G(t) may be adjusted by iterative trials until the predetermined condition is satisfied by an arbitrary machine learning algorithm.

Next, the estimation equation of the rainfall intensity $R_{0.01}(t)$ used for estimating the future rainfall intensity $R_{0.01}(t)$ is changed to the estimation equation for rainfall intensity $R_{0.01}(t)$ including the correction term G(t) after the update described above (S307).

Next, when the rainfall intensity-data of the year unit is updated (S308), the latest year n is counted up (S309), and the steps S303 to S307 are repeated. As a result, the estimation accuracy of the rainfall intensity $R_{0.01}(t)$ in the future target year t can be improved year by year.

Figure 8:
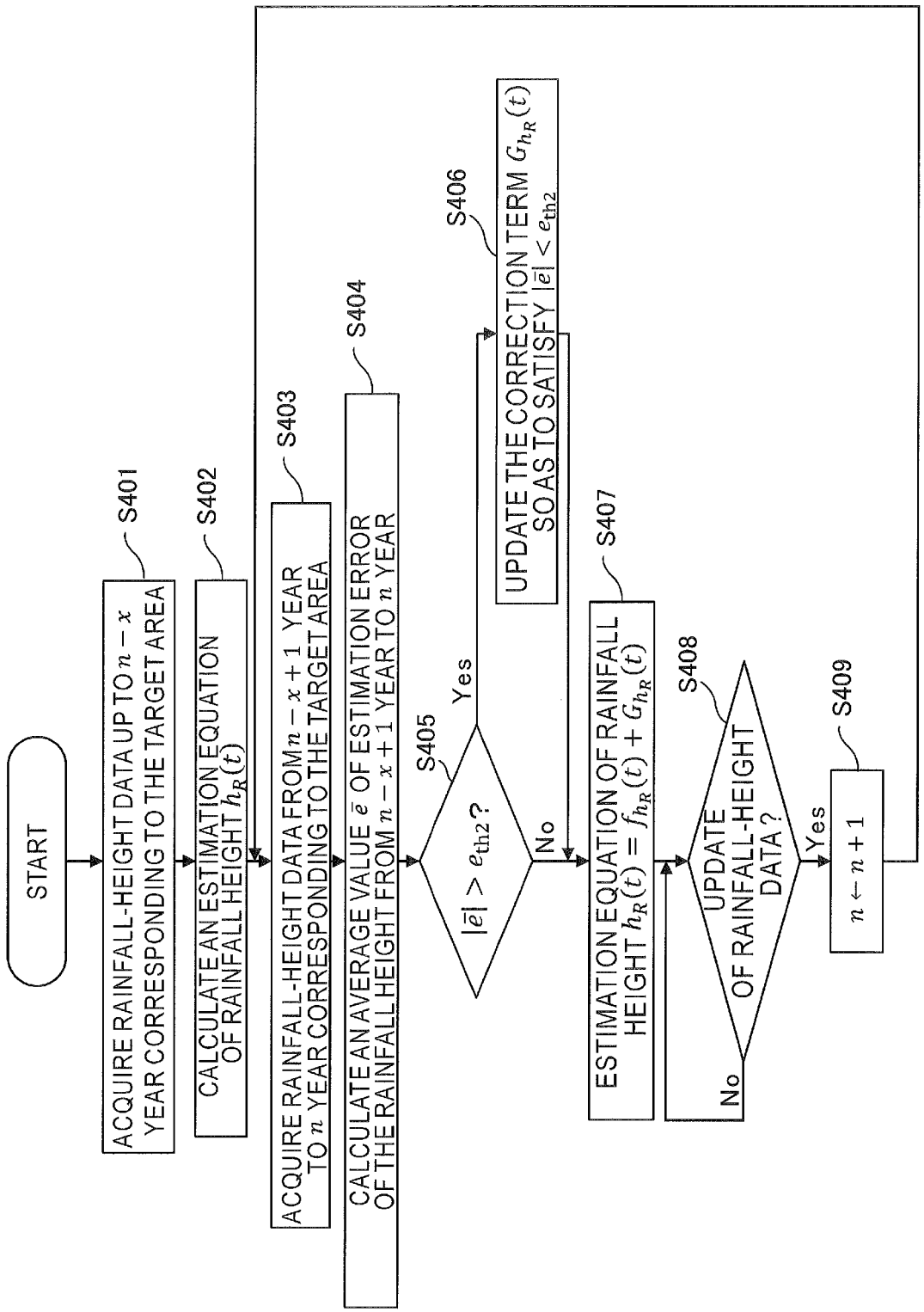
FIG. 8 is a flowchart showing an example of procedures for updating a correction term in an estimation equation for rainfall height.

FIG. 8 is a flowchart showing an example of procedures for updating the correction term $G_{hR}(t)$ in the estimation equation of the rainfall height $h_R(t)$ of FIG. 6. In FIG. 8, the description of the same variables as in FIG. 7 described above is omitted.

In FIG. 8, first, rainfall-height data is acquired as the past weather data up to n−x year corresponding to the target area (S401).

Next, based on the past rainfall-height data acquired in S401, an estimation equation for the rainfall height $h_R(t)$ shown in the above-mentioned equation (3) is calculated (S402). However, the correction term $G_{hR}(t)$ in equation (3) is initially set to zero.

Next, rainfall-height data is acquired as weather data for the past five years from n−x+1 year to n year corresponding to the target area (S403).

Next, an average value of estimation error e of rainfall height for the past five years from n−x+1 year to n year is calculated using the following equation (8) (S404), and the absolute value of the average value of the estimated error e is compared with a predetermined threshold value $e_{th2}$ (S405). The threshold value $e_{th2}$ is set in advance and is, for example, 0.001.

$$\bar{e} = \frac{1}{x} \cdot \sum_{i=n-x+1}^{n} \{h_R(i) - (\text{rainfall hight of } i \text{ year})\} \quad (8)$$

If the absolute value of the average of the rainfall-height estimation errors is greater than the threshold value $e_{th2}$ (Yes in S405), the correction term $G_{hR}(t)$ in the above-mentioned equation (3) is adjusted and updated so as to satisfy the condition that the absolute value of the average value of the rainfall-height estimation errors is smaller than the threshold value $e_{th2}$. Herein, for example, the correction term $G_{hR}(t)$ may be adjusted by iterative trials until a predetermined condition is satisfied by an arbitrary machine learning algorithm.

Next, the estimation equation of the rainfall height $h_R(t)$ used for estimating the future rainfall height is changed to the estimation equation of the rainfall height $h_R(t)$ including the correction term $G_{hR}(t)$ after the update described above (S407).

Next, when the rainfall-height data of the year unit is updated (S408), the latest year n is counted up (S409), and the steps S403 to S407 are repeated. As a result, the estimation accuracy of the rainfall height $h_R(t)$ in the future target year t can be improved year by year.

Figure 9:
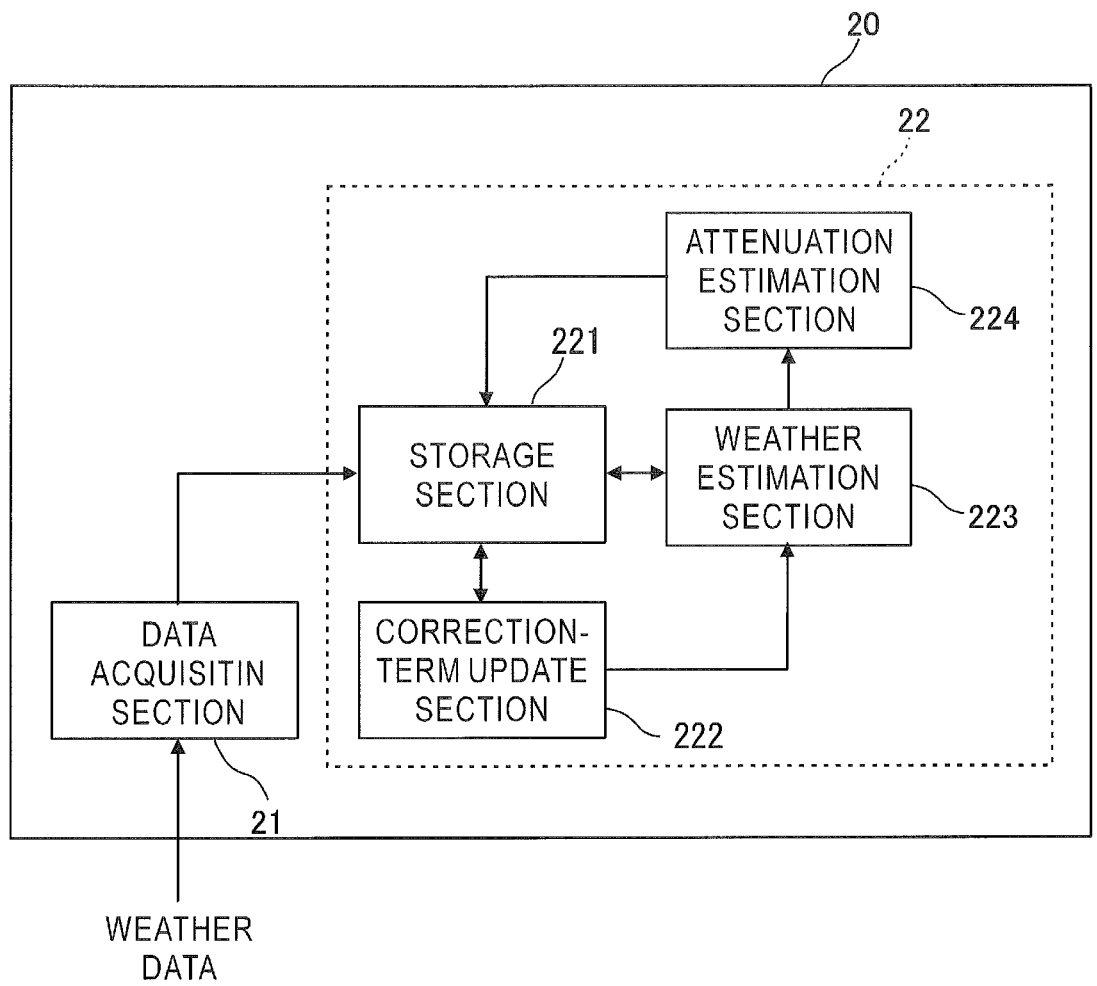
FIG. 9 is a functional block diagram showing an example of a main configuration of a rainfall-attenuation prediction apparatus according to an embodiment.

FIG. 9 is a functional block diagram showing an example of a main configuration of a rainfall-attenuation prediction apparatus 20 according to the embodiment. The rainfall-attenuation prediction apparatus 20 may be provided in a radio apparatus located above the target area, the HAPS 10 or the like having the radio apparatus, or may be provided in a terrestrial station such as the GW station. The rainfall-attenuation prediction apparatus 20 may be configured with a single server or plural servers connected to the communication network such as the Internet or the mobile communication network.

The rainfall-attenuation prediction apparatus 20 is configured with, for example, a computer or processor, and can function as a data acquisition section 21 and an estimation section 22 described later, by reading and executing a predetermined program installed in advance or a predetermined program downloaded via the communication network.

In FIG. 9, the rainfall-attenuation prediction apparatus 20 is provided with the data acquisition section 21 and the estimation section 22. The data acquisition section 21 acquires the weather data including the past rainfall intensity, rainfall height, or both in the target area. The weather data can be acquired, for example, from a server of a weather information provider such as the Japan Meteorological Agency or a private company via the communication network such as the Internet. The weather data acquired by the data acquisition section 21 may be the weather data including the past rainfall intensity, the rainfall height or both measured for the target area by the rainfall-attenuation prediction apparatus 20.

The estimation section 22 estimates the weather (for example, rainfall intensity, rainfall height, or both) corresponding to the future target year in the upper airspace of the target area, based on the weather data for the past rainfall intensity, the rainfall height or both, and estimates the attenuation of radio waves based on the weather estimation result.

The estimation section 22 has, for example, a storage section 221, a correction-term update section 222, a weather estimation section 223 and an attenuation estimation section 224. The storage section 221 stores the weather data for the past rainfall intensity, the rainfall height or both acquired by the data acquisition section 21. The storage section 221 stores information (for example, coefficient in equation, correction term data) on the estimation equation of the rainfall intensity including the above-described correction term, the estimation equation of the rainfall height including the above-described correction term, or both of the estimation equations. Further, the storage section 221 stores the estimation result of the weather (for example, rainfall intensity, rainfall height, or both) estimated by the weather estimation section 223 and the estimation result of radio wave attenuation estimated based on the weather estimation result.

The correction-term update section 222 updates the correction term included in the estimation equation of the rainfall intensity for estimating the future rainfall intensity in the target area, based on the past rainfall-intensity data corresponding to the target area, as exemplified in FIG. 7 described above. The correction-term update section 222 updates the correction term included in the estimation equation of the rainfall height for estimating the future rainfall height in the target area, based on the past rainfall-height data corresponding to the target area, as exemplified in FIG. 8 described above.

The weather estimation section 223 estimates the rainfall intensity of the future target year in the target area based on the estimation equation of the rainfall intensity including the correction term after update, as exemplified in FIG. 5 and FIG. 6 described above. The weather estimation section 223 estimates the rainfall height of the future target year in the target area based on the estimation equation of the rainfall height including the correction term after updating, as exemplified in FIG. 6 described above.

The attenuation estimation section 224 estimates the attenuation of radio waves corresponding to the future target year in the foregoing target area based on the estimation result of the rainfall intensity, as exemplified in FIG. 5 describe above. The attenuation estimation section 224 estimates the foregoing attenuation of electromagnetic waves corresponding to the future target year in the target area, based on the estimation result of the rainfall intensity and the estimation result of the rainfall height, as exemplified in FIG. 6 described above. Further, the attenuation estimation section 224 may estimate the foregoing attenuation of electromagnetic waves corresponding to the future target year in the target area based on the estimation result of the rainfall height.

As described above, according to the present embodiment, by estimating the weather (rainfall intensity, rainfall height or both) corresponding to the future target year t in the upper airspace of the target area based on the weather data including the past rainfall intensity and the rainfall height in the target area, and estimating the attenuation of radio waves based on the estimation results of the weather (rainfall intensity, rainfall height or both), it is possible to predict the attenuation of radio waves in the upper airspace of the target area in consideration of the influence of the long-term climate change in future.

It is noted that, the process steps and configuration elements of the apparatus for predicting the attenuation of radio waves, the relay communication station of the radio apparatus (communication relay apparatus) such as the HAPS, the feeder station, the gateway station, the management apparatus, the monitoring apparatus, the remote control apparatus, the server, the terminal apparatus (user equipment, mobile station, communication terminal), the base station, the base station apparatus, RRH and BBU described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, computer apparatus, radio relay apparatus, feeder station, gateway station, base station, base station apparatus, radio-relay station apparatus, terminal apparatus (user equipment, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: HAPS
11: relay communication station
20: rainfall-attenuation prediction apparatus
21: data acquisition section
22: estimation section
70: GW station
90: cloud
95: propagation-loss increasing part (rainfall area)
221: storage section
222: correction-term update section
223: weather estimation section
224: attenuation estimation section

The invention claimed is:
1. An apparatus for predicting an attenuation of electromagnetic waves between a radio apparatus located above a target area and a terrestrial surface, comprising:
    a data acquisition section for acquiring past weather data in the target area; and
    an estimation section for estimating a weather corresponding to a future target year in an upper airspace of the target area based on the past weather data, and estimating an attenuation of electromagnetic waves based on an estimation result of the weather,
    wherein the data acquisition section acquires past rainfall-intensity data in the target area, and
    wherein the estimation section:
    updates a correction term included in an estimation equation of rainfall intensity for estimating a future rainfall intensity in the target area, based on the past rainfall-intensity data corresponding to the target area;

estimates a rainfall intensity of the future target year in the target area, based on the estimation equation of rainfall intensity including the correction term after updating; and estimates the attenuation of the electromagnetic waves corresponding to the future target year in the target area, based on an estimation result of the rainfall intensity.

2. The apparatus according to claim 1,
wherein the data acquisition section acquires rainfall-intensity data corresponding to each of past plural years in the target area, and
wherein the estimation section:
calculates a rainfall intensity corresponding to each of the past plural years in the target area by using the estimation equation of rainfall intensity;
calculates plural estimation errors of rainfall intensity, each estimation error being a difference between the calculated value of the rainfall intensity and the data of the rainfall intensity corresponding to each of the past plural years in the target area; and
updates the correction term included in the estimation equation of rainfall intensity so that an average value of the plural estimation errors of rainfall intensity is smaller than a predetermined threshold value.

3. An apparatus for predicting an attenuation of electromagnetic waves between a radio apparatus located above a target area and a terrestrial surface, comprising:
a data acquisition section for acquiring past weather data in the target area; and
an estimation section for estimating a weather corresponding to a future target year in an upper airspace of the target area based on the past weather data, and estimating an attenuation of electromagnetic waves based on an estimation result of the weather,
wherein the data acquisition section acquires past rainfall-intensity data and past rainfall-height data in the target area, and
wherein the estimation section:
updates a correction term included in an estimation equation of rainfall intensity for estimating a future rainfall intensity in the target area, based on the past rainfall-intensity data corresponding to the target area;
updates a correction term included in an estimation equation of rainfall height for estimating a future rainfall height in the target area, based on the past rainfall-height data corresponding to the target area;
estimates a rainfall intensity of the future target year in the target area, based on the estimation equation of rainfall intensity including the correction term after updating;
estimates a rainfall height of the future target year in the target area, based on the estimation equation of rainfall height including the correction term after updating; and
estimates an attenuation of the electromagnetic waves corresponding to the future target year in the target area, based on an estimation result of the rainfall intensity and an estimation result of the rainfall height.

4. The apparatus according to claim 3,
wherein the data acquisition section acquires rainfall-intensity data and rainfall-height data corresponding to each of past plural years in the target area, and
wherein the estimation section:
calculates a rainfall intensity corresponding to each of the past plural years in the target area by using the estimation equation of rainfall intensity;
calculates plural estimation errors of rainfall intensity, each estimation error being a difference between the calculated value of the rainfall intensity and the rainfall-intensity data corresponding to each of the past plural years in the target area;
updates the correction term included in the estimation equation of rainfall intensity so that an average value of the plural estimation errors of rainfall intensity is smaller than a predetermined threshold value;
calculates a rainfall height corresponding to each of the past plural years in the target area by using the estimation equation of rainfall height;
calculates plural estimation errors of rainfall height, each estimation error being a difference between the calculated value of the rainfall height and the rainfall-height data corresponding to each of the past plural years in the target area; and
updates the correction term included in the estimation equation of rainfall height so that an average value of the plural estimation errors of rainfall height is smaller than a predetermined threshold value.

5. The apparatus according to claim 1,
wherein the rainfall intensity subject to be estimated is a rainfall intensity $R_{0.01}$ [mm/h] corresponding to a case that a time percentage in one year is 0.01%.

6. A method for predicting an attenuation of electromagnetic waves between a radio apparatus located above a target area and a terrestrial surface, comprising:
acquiring past weather data in the target area;
estimating a weather corresponding to a future target year in an upper airspace of the target area based on the past weather data, and estimating an attenuation of electromagnetic waves based on an estimation result of the weather;
acquiring past rainfall-intensity data in the target area;
updating a correction term included in an estimation equation of rainfall intensity for estimating a future rainfall intensity in the target area, based on the past rainfall-intensity data corresponding to the target area;
estimating a rainfall intensity of the future target year in the target area, based on the estimation equation of rainfall intensity including the correction term after updating; and
estimating the attenuation of the electromagnetic waves corresponding to the future target year in the target area, based on an estimation result of the rainfall intensity.

7. A non-transitory computer readable medium containing software that is executed by a computer or processor installed in an apparatus that predicts an attenuation of electromagnetic waves between a radio apparatus located above a target area and a terrestrial surface, the software comprising:
executable code that acquires past weather data in the target area;
executable code that estimates a weather corresponding to a future target year in an upper airspace of the target area based on the past weather data, and estimates an attenuation of electromagnetic waves based on an estimation result of the weather;
executable code that acquires past rainfall-intensity data in the target area;
executable code that updates a correction term included in an estimation equation of rainfall intensity for estimating a future rainfall intensity in the target area, based on the past rainfall-intensity data corresponding to the target area;
executable code that estimates a rainfall intensity of the future target year in the target area, based on the estimation equation of rainfall intensity including the correction term after updating; and executable code that estimates the attenuation of the electromagnetic waves corresponding to the future target year in the target area, based on an estimation result of the rainfall intensity.

8. The apparatus according to claim 2,
wherein the rainfall intensity subject to be estimated is a rainfall intensity $R_{0.01}$ [mm/h] corresponding to a case that a time percentage in one year is 0.01%.

9. The apparatus according to claim 3,
wherein the rainfall intensity subject to be estimated is a rainfall intensity $R_{0.01}$ [mm/h] corresponding to a case that a time percentage in one year is 0.01%.

10. The apparatus according to claim 4,
wherein the rainfall intensity subject to be estimated is a rainfall intensity $R_{0.01}$ [mm/h] corresponding to a case that a time percentage in one year is 0.01%.

11. A method for predicting an attenuation of electromagnetic waves between a radio apparatus located above a target area and a terrestrial surface, comprising:

acquiring past weather data in the target area;

estimating a weather corresponding to a future target year in an upper airspace of the target area based on the past weather data, and estimating an attenuation of electromagnetic waves based on an estimation result of the weather;

acquiring past rainfall-intensity data and past rainfall-height data in the target area;

updating a correction term included in an estimation equation of rainfall intensity for estimating a future rainfall intensity in the target area, based on the past rainfall-intensity data corresponding to the target area;

updating a correction term included in an estimation equation of rainfall height for estimating a future rainfall height in the target area, based on the past rainfall-height data corresponding to the target area;

estimating a rainfall intensity of the future target year in the target area, based on the estimation equation of rainfall intensity including the correction term after updating;

estimating a rainfall height of the future target year in the target area, based on the estimation equation of rainfall height including the correction term after updating; and estimating an attenuation of the electromagnetic waves corresponding to the future target year in the target area, based on an estimation result of the rainfall intensity and an estimation result of the rainfall height.

12. A non-transitory computer readable medium containing software that is executed by a computer or processor installed in an apparatus that predicts an attenuation of electromagnetic waves between a radio apparatus located above a target area and a terrestrial surface, the software comprising:

executable code that acquires past weather data in the target area;

executable code that estimates a weather corresponding to a future target year in an upper airspace of the target area based on the past weather data, and estimating an attenuation of electromagnetic waves based on an estimation result of the weather;

a program code for acquiring past rainfall-intensity data and past rainfall-height data in the target area;

executable code that updates a correction term included in an estimation equation of rainfall intensity for estimating a future rainfall intensity in the target area, based on the past rainfall-intensity data corresponding to the target area;

executable code that updates a correction term included in an estimation equation of rainfall height for estimating a future rainfall height in the target area, based on the past rainfall-height data corresponding to the target area;

executable code that estimates a rainfall intensity of the future target year in the target area, based on the estimation equation of rainfall intensity including the correction term after updating;

executable code that estimates a rainfall height of the future target year in the target area, based on the estimation equation of rainfall height including the correction term after updating; and executable code that estimates an attenuation of the electromagnetic waves corresponding to the future target year in the target area, based on an estimation result of the rainfall intensity and an estimation result of the rainfall height.

* * * * *